April 12, 1932.   C. D. CUTTING   1,853,300
UNIVERSAL JOINT
Filed July 9, 1927
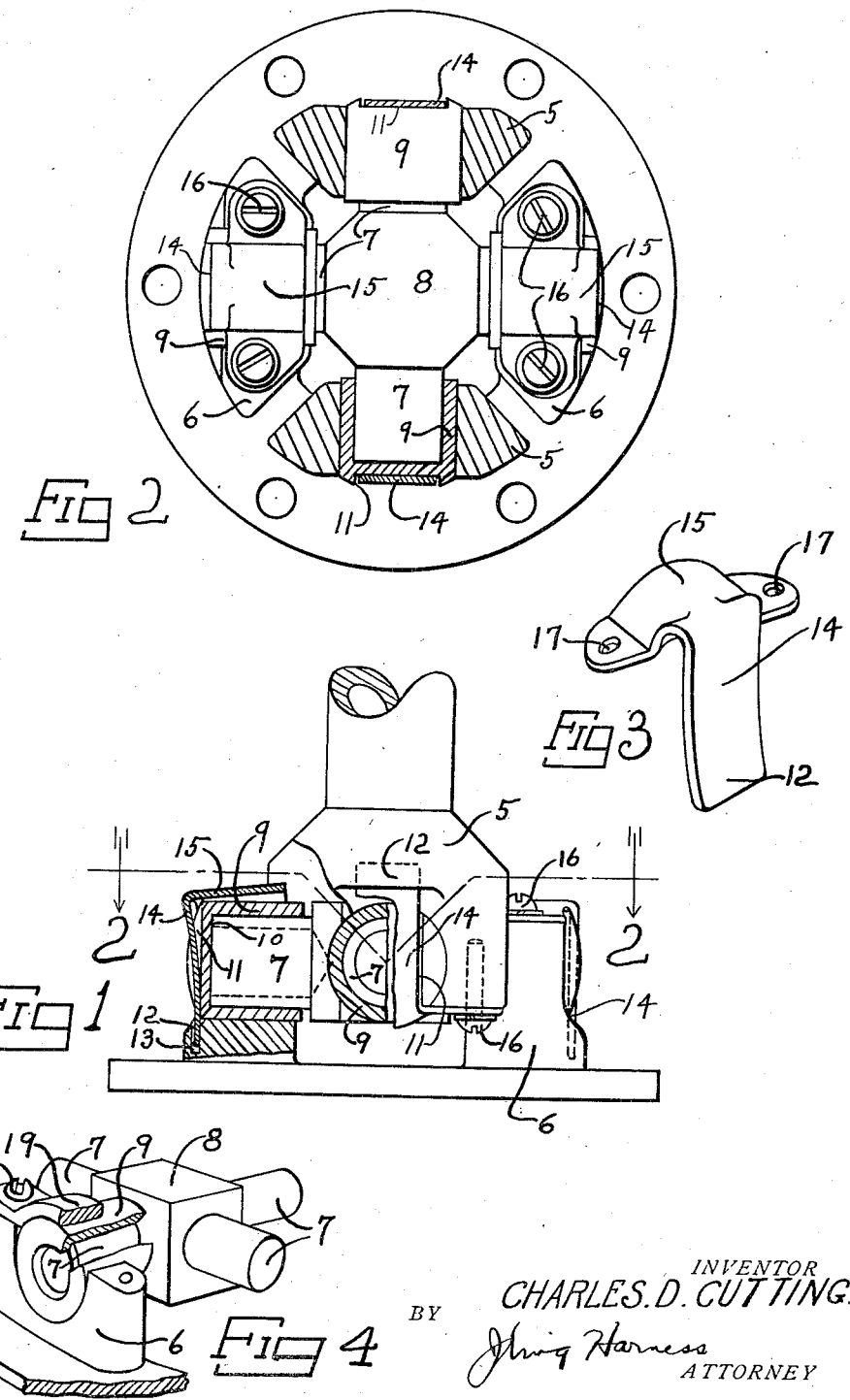
INVENTOR
CHARLES. D. CUTTING.
BY
*Irving Harness*
ATTORNEY Patented Apr. 12, 1932

1,853,300

UNITED STATES PATENT OFFICE

CHARLES D. CUTTING, OF DETROIT, MICHIGAN

UNIVERSAL JOINT

Application filed July 9, 1927. Serial No. 204,490.

One of the primary objects of my invention is to provide a simple and economical joint as well as one which may be easily assembled and adjusted. A still further object is to provide a simple and efficient means for providing and adjusting an end thrust element of the joint.

With the above and other objects in view, my invention consists in the arrangement, combination and construction of the various parts of my improved device, as described in the specification, claimed in my claims and shown in the accompanying drawings, in which:

Fig. 1 is a plan view, with certain parts broken away, illustrating a construction embodying my invention.

Fig. 2 is a view taken substantially on line 2—2 of Fig. 1.

Fig. 3 is a perspective of the bearing fastening means employed in my device.

Fig. 4 is a detailed sectional view showing a modified form of the bearing fastening device.

I have shown a joint comprising yokes 5 and 6, the outer ends of the arms of which are open to receive cross arms 7 which extend from the central portion 8 of a conventional cardon cross. Each of the arms 7 is provided with a bearing sleeve 9 in its end opening having a closed end adapted to form an end thrust bearing as at 10 and also provided with a slot or depression 11 in the outer surface of such closed end. For the purpose of securing the arms and their sleeves in the yokes as well as for the purpose of forcing the ends of the sleeves against the ends of the arms, I have provided for each yoke arm a fastener element having a tongue 12 which is adapted to be engaged in a groove 13 of its yoke arm, an intermediate curved portion 14 which is adapted to bear against the end of its adjacent sleeve 9 at the bottom of the slot 11, and a cap portion 15 at substantially right angles thereto which is adapted to engage over the top of its sleeve 9 and to be secured to its yoke arm by screws 16 extending through the openings 17, thereby exerting a radial pressure on the co-operating sleeve tending to clamp it against movement. It will be noted by particular reference to Fig. 1 that when assembling, the cap portion 15 of the fastening device normally tends to be positioned outwardly from its final position because of the curved portion 14 engaging the bottom of the slot 11 so that in order to engage the screws 16 it is necessary to force the top of the fastening device inwardly toward the center of the joint, thereby placing the central portion 14 under tension and holding the end of each sleeve 9 pressed against the end of its cross arm 7. The central portion 14 of each device is slightly less in width than the cooperating slot 11 on the sleeve in which it is received so as to prevent turning of the sleeve and also prevent the tongues 12 from being dislocated. It will be readily apparent that if slight wear of the end thrust bearing 10 occurs the spring tension in the central portion 14 of the fastening device will continue to force each sleeve against its cross arm. It will be readily understood that the closed end 10 of each sleeve may be hardened or a hardened washer may be inserted therein for the purpose of taking the wear of the end thrust against the same.

In the construction shown in Fig. 4 the fastening device is composed solely of a cap 19, no end bearing fastening element being shown. In a construction of this type the clamping action of the cap against the sleeve is relied upon to hold its sleeve against longitudinal displacement without the assistance of an end piece for accomplishing that purpose.

It will be obvious that various changes may be made in the arrangement, combination and construction of the various parts of my improved device without departing from the spirit of my invention and it is my intention to cover by my claim such changes as may be reasonably included within the scope thereof.

What I claim is:

1. A universal joint comprising a pair of yokes and a cross, each yoke arm having a cross arm therein, a sleeve on each cross arm, an end thrust bearing for the arm in each sleeve and a cap secured to each yoke arm bearing on its sleeve to hold the sleeve against movement, each said cap having a portion extended over the end of its adjacent sleeve.

2. A universal joint comprising a pair of yokes and a cross, each yoke arm having a cross arm therein, a sleeve on each cross arm, an end thrust bearing for the arm in each sleeve and a cap secured to each yoke arm bearing on its sleeve to hold the sleeve against movement, each said cap having a portion extended over the end of its adjacent sleeve and into a portion of the yoke.

3. A universal joint comprising a pair of yokes and a cross, each yoke arm having a cross arm therein, a sleeve on each cross arm, an end thrust bearing for the arm in each sleeve and a cap secured to each yoke arm bearing on its sleeve to hold the sleeve against movement, each said cap having a portion extended over the end of its adjacent sleeve and into a portion of the yoke, said portion being held against the sleeve under spring tension when the cap is secured in place.

4. A universal joint comprising a pair of yokes and a cross, the arms of the cross having bearings, one in each of the yoke arms, an end thrust bearing for each cross arm and a cap secured to each yoke arm holding the cross arm and its end thrust bearing in place, each said cap having a portion extended over the end of its adjacent arm.

5. A universal joint comprising a pair of yokes and a cross, the arms of the cross having bearings, one in each of the yoke arms, an end thrust bearing for each cross arm and a cap secured to each yoke arm holding the cross arm and its end thrust bearing in place, each said cap having a portion extended over the end of its adjacent arm, and into a portion of the yoke.

6. A universal joint comprising a pair of yokes and a cross, the arms of the cross having bearings, one in each of the yoke arms, an end thrust bearing for each cross arm and a cap secured to each yoke arm holding the cross arm and its end thrust bearing in place, each said cap having a portion extended over the end of its adjacent arm and into a portion of the yoke, said portion being held against the bearing member under spring tension when the cap is secured in place.

7. A universal joint having a bearing member, an arm oscillatable in said bearing member, and an end thrust bearing for taking thrust from said arm including a deformed metallic abutment member yieldingly exerting pressure by its inherent tension against said arm.

8. A universal joint comprising a pair of yokes and a cross member, the arms of the cross bearing in the arms of the yokes, end thrust bearings for taking thrust from the arms including spring tensioned pieces exerting pressure against the ends of the arms.

9. A universal joint comprising a pair of yokes and a cross member, the arms of the cross bearing in the arms of the yokes, end thrust bearings for taking thrust from the arms including spring tensioned pieces exerting pressure against the ends of said arms, said pieces being inserted in grooves provided in the yokes.

10. A universal joint comprising a pair of yokes having bearing members associated therewith, slots in at least some of said yokes and means cooperatively engaged with said slots and interposed between the slots and the ends of said bearing members for taking end thrust from said bearing members.

11. A universal joint having bearing members and supports therefor, slots in at least some of said supports and means cooperatively engaged with said slots and interposed between the slots and the ends of said bearings for taking end thrust from said bearing members.

12. A universal joint comprising a pair of yokes having bearing members associated therewith, slots in at least some of said yokes and means cooperatively engaged with said slots and interposed between the slots and the ends of said bearing members for taking end thrust from said bearing members, said means being in the nature of a strip for each slot extended into the slot and acting as a backing plate for an adjacent bearing member.

13. A universal joint having bearing members and supports therefor, slots in at least some of said supports and means cooperatively engaged with said slots and interposed between the slots and the ends of said bearings for taking end thrust from said bearing members, said means being in the nature of a strip for each slot extended into the slot and acting as a backing plate for an adjacent bearing member.

CHARLES D. CUTTING.